Sept. 6, 1966  R. S. GEWARTOWSKI ETAL  3,271,663
APPARATUS FOR INSPECTING BILLETS AND THE LIKE
BY MEANS OF MAGNETIC PARTICLES
Filed April 25, 1962  6 Sheets-Sheet 1

INVENTORS
RICHARD S. GEWARTOWSKI
JOSEPH L. DEIBEL
BY
ATTORNEYS

INVENTORS
RICHARD S. GEWARTOWSKI
JOSEPH L. DEIBEL
BY Hill, Sherman, Meroni, Gross & Simpson ATTORNEYS Sept. 6, 1966 R. S. GEWARTOWSKI ETAL 3,271,663
APPARATUS FOR INSPECTING BILLETS AND THE LIKE
BY MEANS OF MAGNETIC PARTICLES
Filed April 25, 1962 6 Sheets-Sheet 6

INVENTORS
RICHARD S. GEWARTOWSKI
JOSEPH L. DEIBEL
BY
Hill, Sherman, Meroni, Gross & Simpson ATTORNEYS United States Patent Office 3,271,663
Patented Sept. 6, 1966

3,271,663
APPARATUS FOR INSPECTING BILLETS AND THE LIKE BY MEANS OF MAGNETIC PARTICLES
Richard S. Gewartowski and Joseph L. Deibel, Chicago, Ill., assignors, by mesne assignments, to Magnaflux Corporation, Chicago, Ill., a corporation of Delaware
Filed Apr. 25, 1962, Ser. No. 190,103
6 Claims. (Cl. 324—38)

The present invention relates to apparatus for handling and inspection of elongated magnetizable articles such as billets, pipes, rods, bars and the like by the magnetic particle method, that is, by distributing over the surface of the article magnetic particles, after which the article is inspected for flaws and imperfections revealed by the orientation of the magnetic particles on the surface of the article.

Large, heavy articles such as steel billets which are many feet in length present substantial problems in handling and inspection, and especially in respect to inspection because all surfaces must be presented to the view of the inspector. Even where the article is round in cross-section there is a problem of presenting all portions of its periphery for inspection. The problem is, if anything, greater where the article such as a billet of polygonal cross-section has several side surfaces which must be inspected.

Under mass production conditions, attention must be given to not only the cost of equipment and cost of operating the equipment to be amortized in the unit cost per article inspected, but also to the speed with which handling and inspection can be effected in order to minimize inspection labor costs.

It is accordingly an important object of the present invention to provide new and improved inspection apparatus for billets, and similar magnetizable articles, characterized by compactness, convenience, simplicity of construction, efficiency in use and affording a reliable, versatile inspection system.

Another object of the invention is to provide an efficient, compact magnetic particle inspection system for large elongated magnetizable articles such as heavy steel billets.

A further object of the invention is to provide a new and improved apparatus for inspecting billets and the like by the magnetic particle method wherein inspection of all areas of the periphery or the treated article are arranged to be inspected with speed and facility by rotation of the article at a single inspection station.

Still another object of the invention is to provide a new and improved combination magnetic particle applying and article inspection apparatus.

Yet another object of the invention is to provide a new and improved apparatus for complete, thorough inspection of all surfaces of elongated articles of a wide range of lengths and cross-sectional shapes and sizes.

A still further object of the invention is to provide apparatus for magnetic particle inspection of elongated articles lending itself to substantial versatility in respect to cyclical and sequential control and operation.

Other objects, features and advantages of the present invention will be readily apparent from the following detailed description of a preferred embodiment thereof taken in conjunction with the accompanying drawings, in which.

Figure 1:
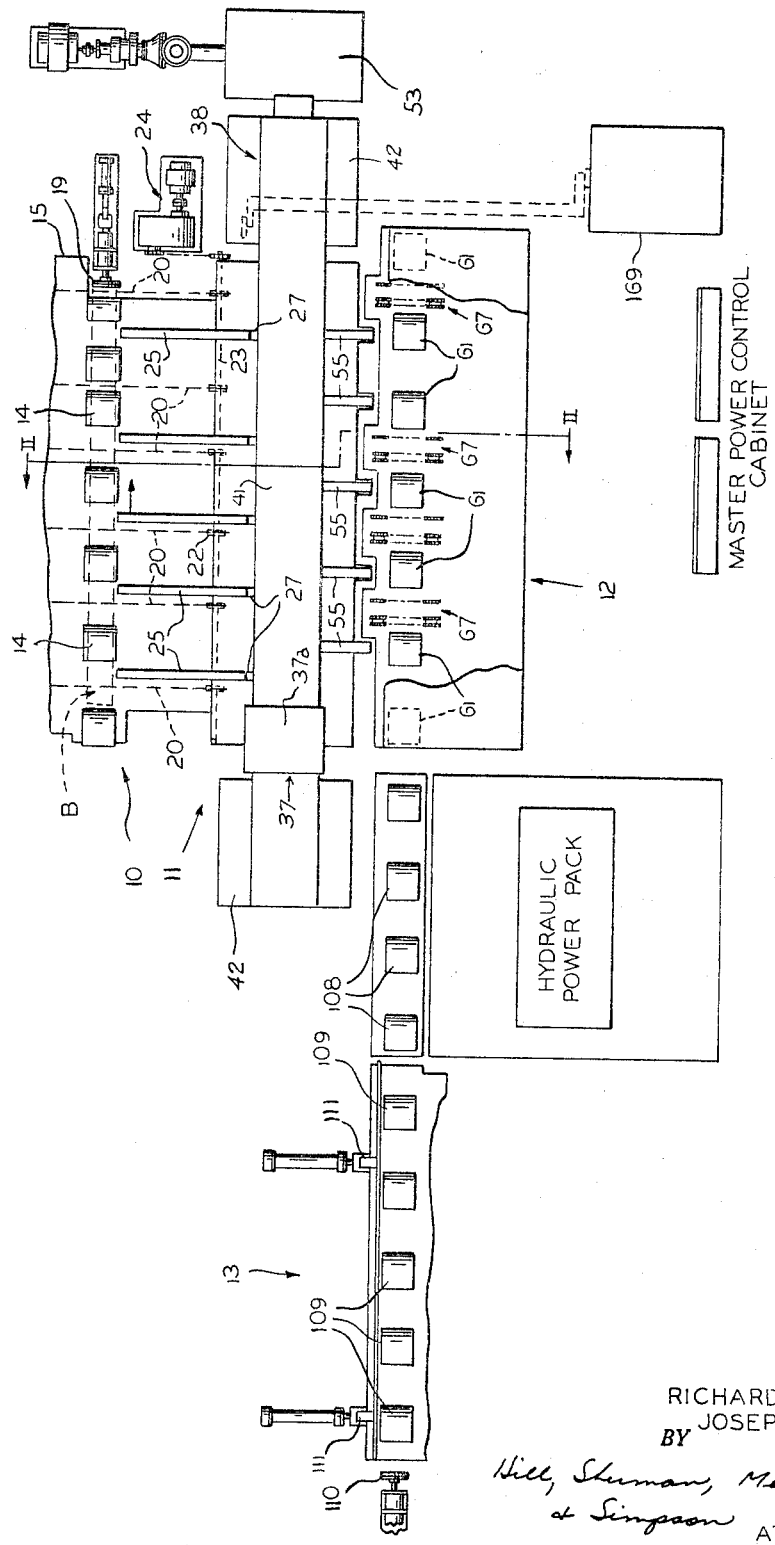
FIGURE 1 is a schematic top plan view of a billet handling and inspection apparatus embodying features of the present invention.
Figure 2:
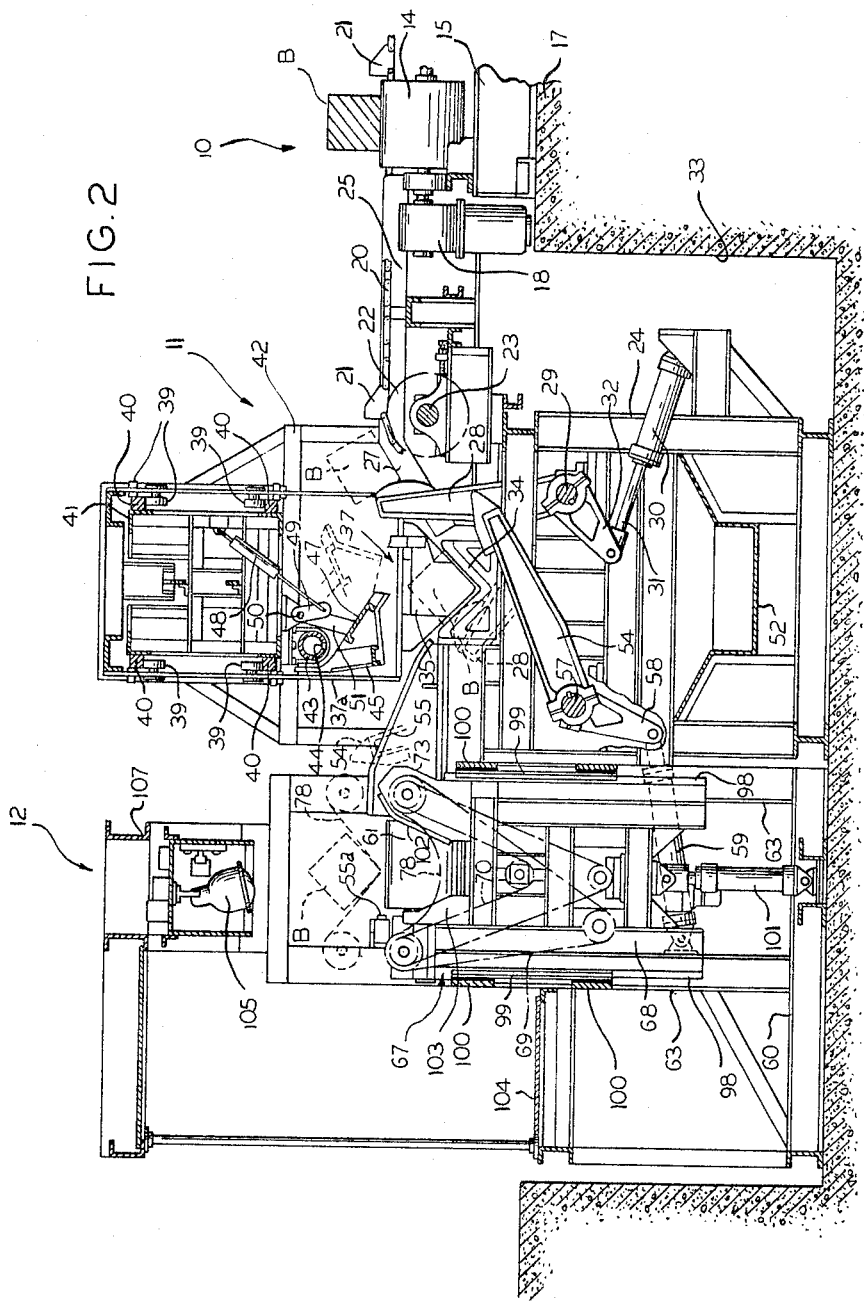
FIGURE 2 is an enlarged fragmentary vertical sectional detail view taken substantially on the line II—II of FIGURE 1.

Having reference to FIGURES 1 and 2, an installation of apparatus embodying the invention is depicted of a type adapted to handle and process for inspection billets of large size, and more particularly billets up to 10" sq. cross-section and up to 16' long, although it will be readily apparent that by appropriate size and clearance selection in constructing the apparatus there is no apparent limit upon the range of practical or commercial size ranges for which the apparatus may be adapted. Although the apparatus is disclosed as especially adapted for handling and inspection of billets of polygonal cross-section, it is usable with equal facility with round billets and billets of other cross-sections. The term "billet" is used herein in a generic sense to include various semi-finished elongated objects or articles, which may be of polygonal or other cross-section and which may be solid or tubular.

A billet B to be inspected is delivered from a loading station 10 to a magnetizing and bath applicator station 11 where the billet is magnetized to provide a substantially uniform magnetic flux over its entire surface except as distorted by defects within the billet, whereupon magnetic particles from a bath containing such particles deposited on the billet are attracted to the regions of distortion of the magentic field and thereby indicate the presence of defects. Thereafter the billet with the magnetically oriented particles thereon is transferred to an inspection station 12 where a person skilled in this art visually inspects the treated billet and applies thereto markings to identify the nature and location of detected flaws or imperfections, and any other identification, advisory, code and like markings that may be desired. After inspection has been completed, the inspected billet is transferred from the inspection station 12 to an unloading assembly 13.

*Loading station*

At the loading station 10, each billet B to be processed is fed or delivered to a line of run-in rollers 14 mounted on a suitable table or framework 15 supported on a mill floor 17. Although the run-in rollers 14 may be driven in unison in any preferred manner, because of their size are desirably individually operated by suitable motors 18, all driven in synchronism. As indicated in FIGURE 1, the run-in rollers 14 are driven to convey the billet B thereon longitudinally in the direction of the directional arrow, that is toward the right to urge the billet endwise into engagement with a snubber 19 which properly aligns the billet for transfer to the magnetizing station with respect to which the run-in rollers 14 support the billet in generally parallel relation.

On the run-in rollers 14, the billet B overlies a transfer conveyor mechanism comprising a spaced parallel plurality of endless transfer conveyor chains 20 provided with properly aligned billet engaging lugs or dogs 21 and trained over appropriate wheels or sprockets 22 mounted on suitable rotary shafts of which a shaft 23 mounted upon framework 24 supporting the apparatus of the magnetizing station 11 is shown in FIGURES 1 and 2. Suitable prime mover or driving motor means 24 are coupled to the shaft 23 for intermittently turning the shaft for driving the conveyor chains 20 located at suitable intervals between the run-in rollers 14 to cause the conveyor chains 20 to be motivated to run toward the magnetizing station 11 whereby a set of the transfer dogs 21 will engage the billet on the run-in rollers 14 and shift it transversely, that is sidewardly from the run-in rollers onto a set of coplanar, parallel horizontal transfer skid bars 25 located at suitable intervals between the transfer conveyor chains 20 and extending from the run-in rollers 14 to a position beyond the transfer conveyor shaft 23 where the billet is deposited on downwardly and forwardly obliquely extending lead-in end portions 27 of the bars properly located with respect to the magnetizing station 11.

Downward sliding of the transferred billet B along the lead-in terminal portions 27 of the transfer bars or rails is arrested by a set of spaced parallel synchronized easedown arms 28 which are rigidly mounted on a rotary shaft 29 carried by the magnetizing station frame 24 as shown in FIG. 2. These ease-down arms 28 are swingable by rotation of the shaft 29 from the billet-arresting position shown in full line to the dash outline position for loading the billet into the magnetizing station. For this purpose, means such as a fluid motor device comprising a hydraulic or pneumatic cylinder 30 has a drive shaft 31 suitably coupled to a rigid crank arm 32 attached to the shaft 29. Operation of the fluid motor 30 causes the shaft 29 to be suitably selectively oscillated to swing the ease-down arms 28 between the billet-arresting and magnetizing station loading positions depicted in timed sequence in an inspection cycle.

*Magnetizing station*

It is desirable to limit the height of the run-in rollers 14 and conveyor chains 20, among other things, to a reasonable height above the mill floor 17. To this end, the magnetizing station framework 24, and more particularly the lower portion of such framework may be mounted within a suitable pit 33 in the floor 17. This arrangement also facilitates observation of operating mechanisms of the apparatus and access for adjustments, clean-out, repairs and the like.

Supported by the framework 24 at suitably spaced longitudinal locations are notch cradle members 34 generally aligned with the terminal ends of the lead-in or ramp portions 27 of the loading rails and providing upwardly opening generally V-shaped cradle notches receptive of the billet B eased thereinto by the ease-down arms 28. Through this arrangement, the billet B loaded into the supporting cradle provided by the members 34 is disposed with one longitudinal corner projecting downwardly and the opposite longitudinal corner projecting upwardly and in position to be magnetized and treated with magnetic particles.

After the billet B has been deposited in the cradle members 34, a magnetizing tail stock 35 (FIG. 2) operated from a tail stock assembly 37 (FIG. 1) engages the adjacent end of the billet cradled by the members 34 and effects an endwise clamping pressure against the billet toward a head stock (not shown) forming part of a head stock assembly 38. Conveniently the tail stock 35 is movably supported for reciprocation between billet engaging and clamping and backed off positions by means comprising a carriage 37a provided with rollers 39 riding on rails 40 carried by a magnetic particle bath applicator frame structure 41 extending longitudinally at a suitable height above the billet cradle assembly of the magnetizing station and mounted on a super-structure frame portion 42 of the framework 24.

After the billet B has been engaged at its respective opposite ends by the head and tail stocks and magnetizing current caused to flow through the billet to develop a substantially uniform magnetic flux over its surface except as distorted by defects within the billet, magnetic particles are distributed over the surface of the billet to be attracted by regions of distortion of the magnetic field to thereby indicate the presence of defects. Such magnetic particles are provided in a suitable bath supplied through a fluid or bath feed pipe 43 carried on the underside of the applicator framework 41 at a suitable height above the billet to be treated, and as shown offset to one side of a vertical plane through the axis of the billet. This pipe 43 extends at least coextensively the full length of the billet B and has a suitable longitudinal downwardly opening series of discharge ports 44 from which the bath fluid with magnetic particles entrained therein discharges uniformly onto an applicator 45 operatively located under the pipe 43 and carrying a flow distribution surface panel or plate 47 extending along the entire length of the pipe 43 and sloping downwardly so that its discharge edge overhangs the billet B to be treated. Since the bath fluid drops onto the surface 47 adjacent to its upper edge, the streams of fluid bath spread out over the surface 47 and combine into a uniform sheet of the fluid which drops from the lower applicator edge as a continuous flat thin stream onto the billet B.

Since the billet B may be warped and thus not present a perfectly straight upper corner to the descending magnetic particle bath, means are provided for oscillating the applicator 45 through a limited range back and forth over the upper corner of the billet so as to effect uniform distribution of the magnetic particle bath onto each of the billet faces sloping from the upper corner. Suitable means for this purpose comprise a motor device such as a pneumatic or hydraulic cylinder and piston type operator 48 carried by the frame 41 and operatively connected to a crank arm 49 rigidly attached to a rock shaft 50 mounted on the underside of the frame 41 adjacent to the pipe 43 and having affixed thereto supporting arms 51 to which the applicator 45 is attached. By operation of the motor device 48 while the applicator 45 is being supplied with magnetic particle bath, the shaft 50 is rocked through a limited range to swing the arms 51 and thus the applicator 45 through an oscillatory cycle which carries the discharge edge of the applicator surface 47 alternately to opposite sides of a vertical plane through the upper longitudinal corner of the billet B being treated whereby to effect uniform distribution of the bath to the upwardly directed surfaces of the billet for uniformly coating such surfaces and then to run down the contiguous downwardly directed faces of the billet so that all faces are supplied with the magnetic particles while the billet is magnetized.

As the bath fluid runs off of the lower longitudinal corner of the billet and off of any of the apparatus in the path of the descending fluid, it is collected in a sump 52 for recirculation by suitable pumping equipment in an assembly 53 disclosed schematically in FIGURE 1.

After treatment of the billet B with magnetic particles has been completed, the treated billet is transferred to the inspection station 12. To this end, the applicator 45 is swung into an out-of-the-way, clearance position as shown in dash outline in FIG. 2 by operation of the motor device 48. This enables the treated billet B, which has now been released from clamped engagement with the magnetizing head and tail stocks, to be lifted by transfer arms 54 from the cradle members 34 and shifted laterally onto skid rails 55 carried by the frame 24 adjacent to and projecting toward the inspection station 12. Normally the transfer arms 54 underlie the cradled billet B as shown in FIGURE 2.

For swinging operation of the transfer arms 54, they are mounted rigidly on a rock shaft 57 suitably mounted on the frame 24 and having a crank arm 58 to which actuating means conveniently in the form of a fluid motor such as a pneumatic or hydraulic cylinder and piston member 59 is operatively attached. For convenience, the operator 59 may be anchored to a frame 60 provided for the inspection station 12.

In timed sequence with clearing of the treated billet

B from the magnetizing station 11, the ease-down arms 28 are returned to their billet-arresting position and a succeeding billet to be treated is delivered to the ease-down arms. Then after the transfer arms 54 have been returned to their starting position, the next succeeding billet B is loaded into the magnetizing station, and the magnetizing and treating cycle may be repeated.

*Inspection station*

For integration with the magnetizing station 11, the inspection station 12 has its frame 60 mounted in the pit 33 alongside and parallel with the fram 24.

As the magnetically treated billet B is pushed from the outer ends of the skid rails 55 by the transfer arms 54, the billet drops onto a set of at that time stationary friction rollers 61 but are rotatably mounted on a table or frame platform structure 62 (FIGS. 3 and 4) carried by uprights 63 of the frame 60. There are as many of the rollers 61 as necessary to afford adequate horizontal support for the billet received thereon and to serve as run-out rollers to convey the billet from the inspection station after inspection has been completed. For this purpose, each of the rollers has mounted on its shaft a transmission gear assembly 64 to which is compled an individual drive motor 65. All of the rollers 61 are, of course, properly aligned on parallel horizontal axes, with the top peripheries of the rollers in a horizontal plane, and the motors 65 are arranged to be simultaneously driven.

Inasmuch as all sides of the billet must be presented to view during inspection, means are provided for lifting the billet from the rollers 61 after deposit thereon, turning the billet generally about its axis for inspection of its entire periphery, and then redeposit of the billet onto the rollers 61 for running out of the inspected billet by rotary simultaneous activation of the rollers 61 by the motors 65. To this end, a suitable number of individual but synchronously operable billet turners 67 is carried by the frame 60 and located at suitable intervals between the rollers 61.

Figure 3:
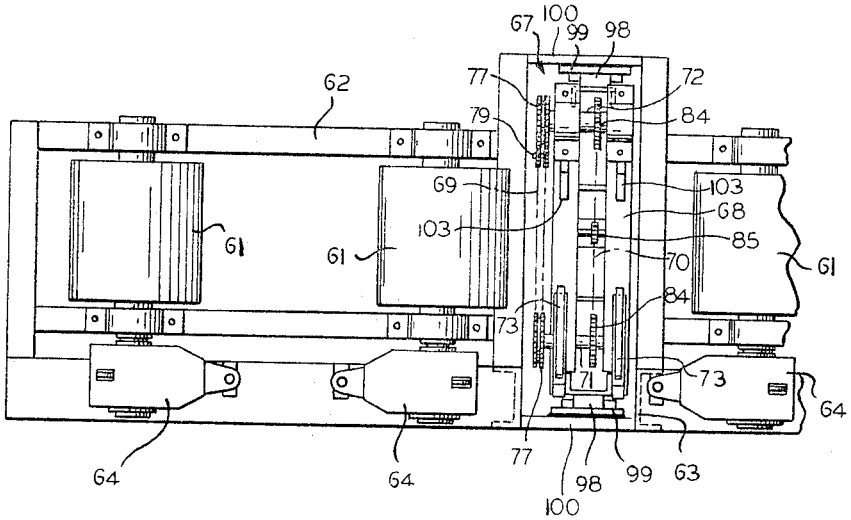
FIGURE 3 is a top plan view of a portion of the inspection station of the apparatus.
Figure 4:
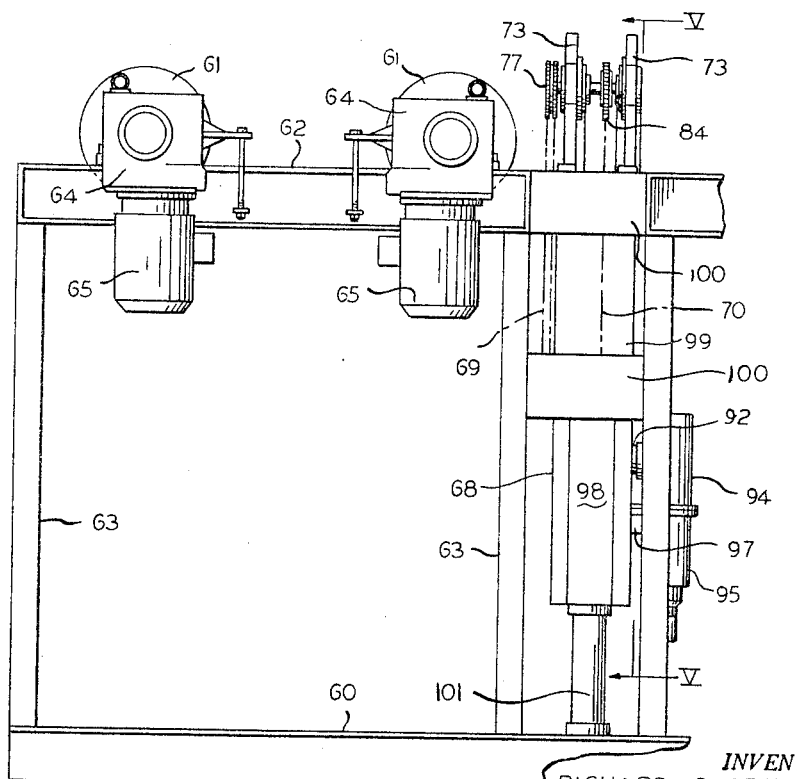
FIGURE 4 is a side elevational view of that portion of the inspection station apparatus shown in FIGURE 3.
Figure 5:
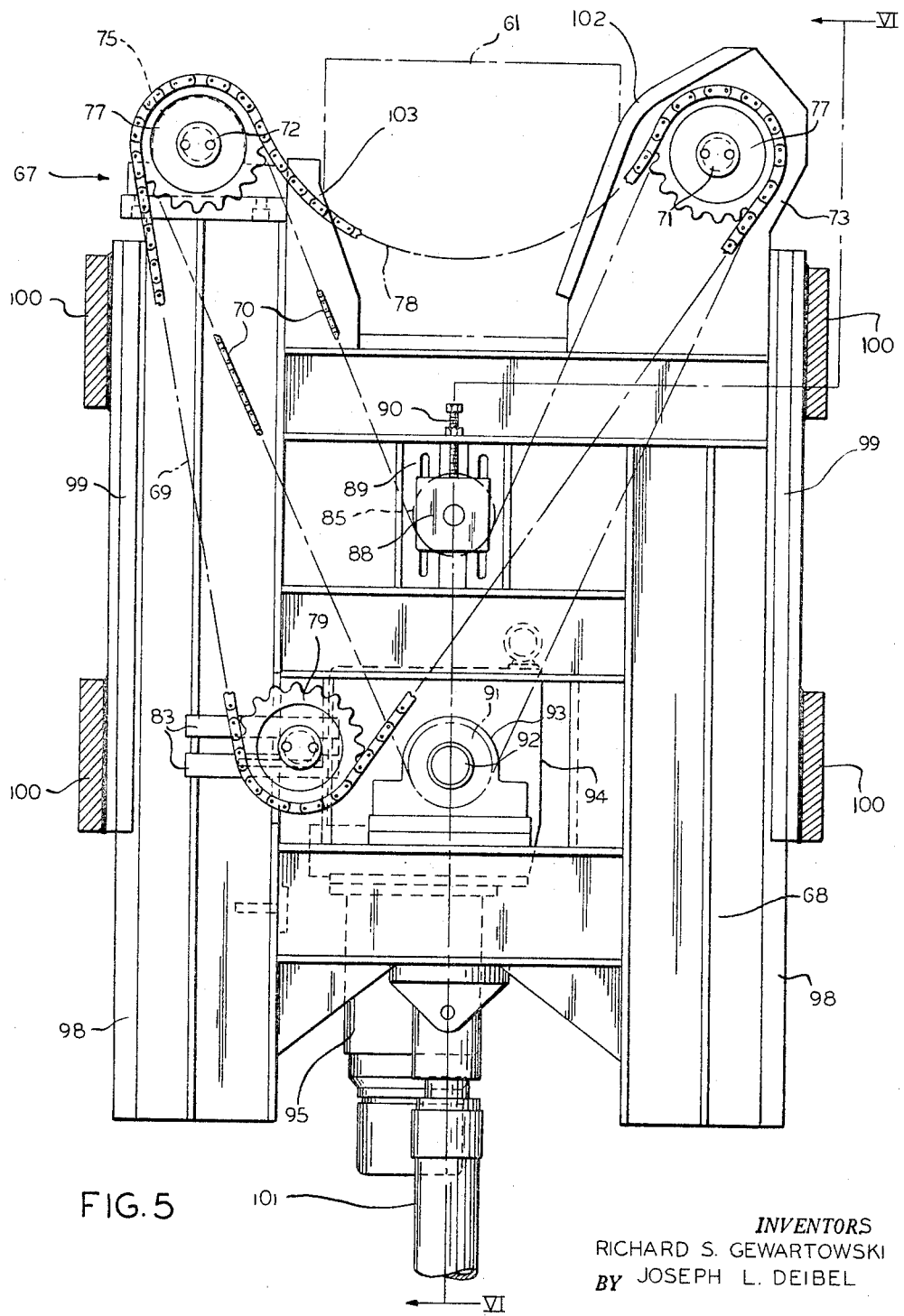
FIGURE 5 is a fragmentary enlarged sectional elevational detail view taken substantially on the line V—V of FIGURE 4.
Figure 6:
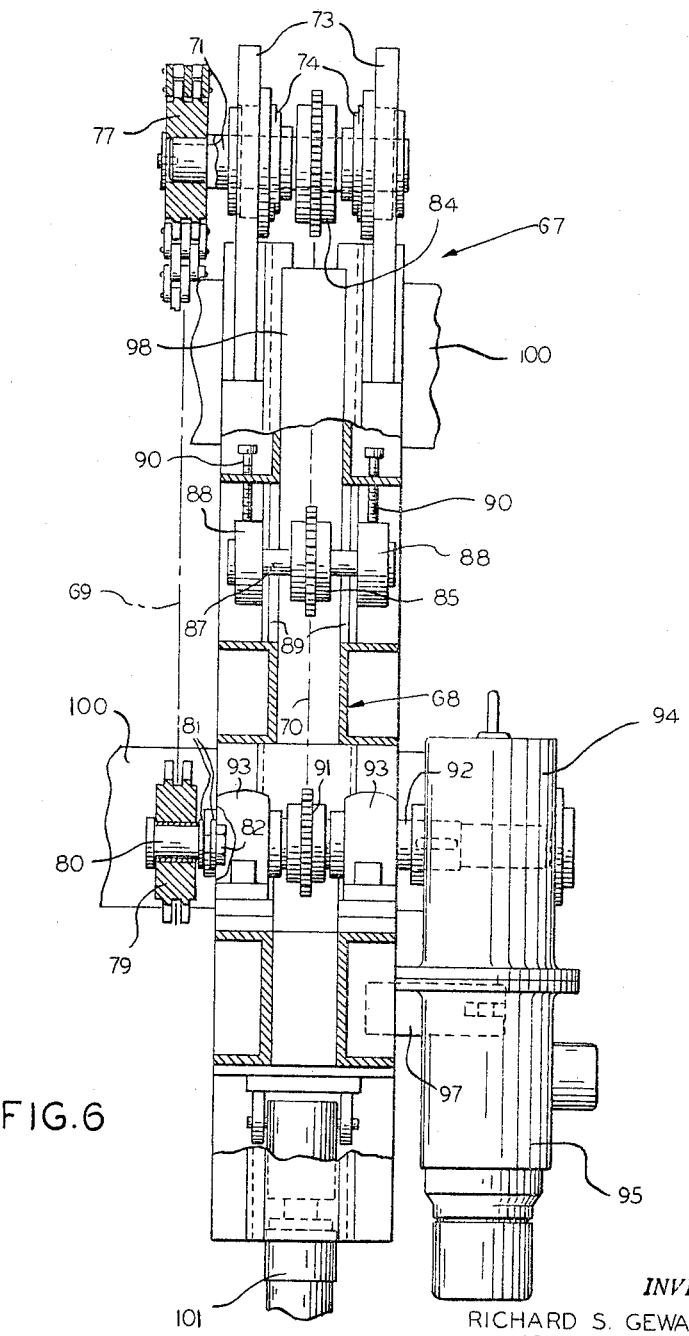
FIGURE 6 is a fragmentary sectional elevational detail view taken substantially on the line VI—VI of FIGURE 5.

As best seen in FIGURES 1 and 3, each of the billet turners 67 is narrow enough to be located operatively between a pair of the rollers 61, where the rollers are about equally spaced along the run-out path. For this purpose, each of the billet turners 67 comprises a narrow rigid substantially rectangular frame 68 (FIGS. 2, 4, 5 and 6) which is vertically elongated and of a depth, that is, front to rear dimension, somewhat greater than the width of the roller supporting table frame 62 and substantially centered with respect to such width. Carried by the frame 68 is a heavy duty double width billet supporting and turning sprocket chain 69, and a single width driving sprocket chain 70. Means for operatively supporting the chains on the upper end of the supporting body or frame 68 comprise a pair of rotatable, driven shafts 71 and 72 (FIGS. 3, 5 and 6). A mounting for the shaft 71 is provided by a pair of heavy upstanding identical spaced parallel plates 73 rigidly attached to the respective opposite rear side portions of the top of the frame 68, that is adjacent to the magnetizing station and on the billet-receiving side of the inspection station assembly. Bearing assemblies 74 carried by the plates rotatably journal the shaft. Rotary support on a parallel, horizontally coplanar axis, and coextensively with the shaft 71 is provided for the shaft 72 by suitable spaced bearing assemblies 75 fixedly mounted on the front end portion of the top of the body frame 68, that is, at the opposite end of the frame from the plates 73.

For supporting the billet carrying and turning chain 69, the shafts 71 and 72 have end portions thereof projecting from one side of the supports therefor and freely beyond that side of the body frame 68. On these ends of the shafts are keyed respective identical double sprocket wheels 77 on and over which the billet carrying and turning chain 69 is trained in such a manner that between the sprockets 77 the chain sags in a catenary or sling 78. Below the sprockets 77, the chain 69 is trained over a double sprocket idler wheel or gear 79 mounted on a stub shaft 80 (FIG. 6) mounted for horizontal chain take-up adjustment as by means of washers 81 and a securing nut 82 carried thereby and coacting to secure the same in adjusted position horizontally on a gib bracket 83 fixedly carried by the body frame 68. By adjusting the stub shaft 80 along the gib bracket 83, proper coordination of the depth of the sling portion 78 of the chain 69 can be readily effected for all of the billet turners 67 to equalize their billet supporting function.

With respect to the driving chain 70, respective sprockets 84 are keyed to the shafts 71 and 72 between the supporting bearings for the shaft, the chain 70 being trained over the sprockets 84 and looping down within the body frame 68, which, as best seen in FIG. 6, is constructed hollow for this purpose. That portion of the driving chain 70 which loops down between the sprockets 84 is trained over a take-up idler sprocket 85 mounted on a shaft 87 journaled in take-up blocks 88 vertically guided by rigid vertical guides 89 on the body frame 68, and vertically adjustable by means of respective adjusting screws 90.

For driving the driving chain 70, its lowest loop portion is trained over a driving sprocket 91 keyed to a drive shaft 92 journaled in bearing assemblies 93 supported by the lower portion of the body frame 68 and having an extension projecting beyond the opposite side of the body frame 68 from the billet supporting and turning chain 69 and keyed in driven relation to gearing within a gear assembly 94 to which is attached a motor 95 suitably connected to a bracket 97 projecting from the body frame 68. Through this arrangement, driving of the shaft 92 drives the driving chain 70 which synchronously drives the sprocket shafts 71 for thereby driving the billet supporting and turning chain 69 as desired.

In order to enable the billet turners 67 to pick up a billet from the run-out rollers 61, and redeposit the billet onto the run-out rollers, means are provided for selectively raising and lowering the billet turners in unison. To this end, the body frame 68 of each of the billet turner assemblies is provided with means for vertically reciprocably guiding the same with respect to the supporting framework 60. Conveniently this is effected by having respective coextensive, parallel vertical rigid guide rails 98 on the respective vertical edges of the body frame 68 slidably guided in respective vertical guide channels 99 supported in proper opposed parallel spaced alignment by bracket plates 100 rigidly secured to the uprights 63 of the supporting frame 60. Thereby the turner assembly 67 is readily vertically shiftable between a lower limit as shown in full line in FIGURE 2 where it clears the run-out roller 61 and an elevated billet supporting position as shown in dash outline in FIGURE 2 by means conveniestly comprising a fluid motor device 101 of the pneumatically or hydraulically actuated cylinder and piston variety operatively attached at its lower end to the base structure of the frame 60 and at its upper end to the lower end portion of the body frame 68.

Before transfer of a magnetically treated billet B from the magnetizing station 11 to the inspection station 12, the billet turners 67 are disposed in the depressed, clearance position shown in full line in FIGURE 2. Then, with the run-out rollers 61 at rest, the treated billet is transferred to such rollers. As will be observed, the adjacent ends of the transfer skid rails 55 are slightly higher than the tops of the rollers 61, and adjacent the opposite ends of the rollers a retaining bumper structure 55a is provided so that as the treated billet is pushed by the transfer arms 54 onto the rollers 61, the billet will be precluded from bouncing or rolling from the ends of the rollers 61 but will be confined to lie on the rollers. Then the actuators 101 of the plurality of billet turners 67 are operated to raise the billet turners until as shown in dash outline in FIGURE 2 the billet is supported within the slings 78 of the supporting and turning chains 69.

As each of the billet turners 67 rises to engage the billet, sloping guard rails 102 on the inner edges of the plates 73 guide the billet toward centered position on the sling 78 should the billet be in overlying relation to the rails 102. Providing a guide throat complementally opposing the guide rails 102 is a pair of sloping edge heavy guide plates 103 rigidly secured to the body frame 68 on the opposite side of the sling 78 from the guide rails 102 and functioning as the billet turner is raised to move the billet toward centered relation in the sling if displaced toward the guide plates 103. Further, the guide plates 103 serve as stops protecting the adjacent frame and bearing and sprocket assembly against flipping or rolling or tossing of the billet theretoward as the billet turner rises to engage the billet, or during subsequent operation. This function is also performed by the guide rails 102 in respect to the sprocket assemblies adjacent thereto.

After the billet B has been raised and is fully supported by the slings 78 of the billet turner chains 69, inspection of all peripheral surfaces of the billet can proceed. To this end, a viewing platform 104 is provided along and supported by the inspection station frame 60 on the side thereof opposite from the magnetizing station 11 for supporting the billet inspector. This platform is of such length that the inspector may walk the entire length of the billet B. For properly illuminating any concentration of magnetic particles over regions of the billet having defects therein, lights 105 are supported by a superstructure 107 of the framework 60 in proper position over the billet B to be inspected.

After inspection of one side, or two sides simultaneously, of the billet B, the inspector in suitable manner causes operation of the drive motors 95 of the billet turners 67 to effect driving of the billet supporting chains 69 whereby the billet cradled in the sling 78 is turned about its axis until another side or sides to be inspected of the billet is or are turned up to the view of the inspector. Gravity causes the billet to tend to remain in the lowest portion or bight of the slings 78 so that as the chain 69 travels in the selected direction as motivated by the driven sprockets 77, the billet is caused to roll in the slings. Assuming the direction of travel of the chain in the sling 78 to be toward the stop-guide bars or plates 103, should the billet tend to follow along with the chain, the billet will be deflected back toward the bight of the sling 78 upon contacting the stops 103. Incremental turning of the billet is selectively accomplished by the inspector until inspection of the billet has been completed and any markings, chipping, grinding, or other treatment of the billet being inspected has been completed.

Upon completion of the inspection, the billet turners 67 are caused to descend by operation of the actuators 101 to their lowermost or starting position and thereby the billet is returned to the run-out rollers 61. These rollers are then activated through their motors 65 to run the billet endwise onto transfer rollers 108 (FIG. 1) aligned with the rollers 61 and with unloading table rollers 109 onto which the billet is driven and on which it continues to travel endwise until it strikes a snubber 110 and is then shifted sidewardly off of the rollers 109 by action of ejectors 111.

Figure 7:
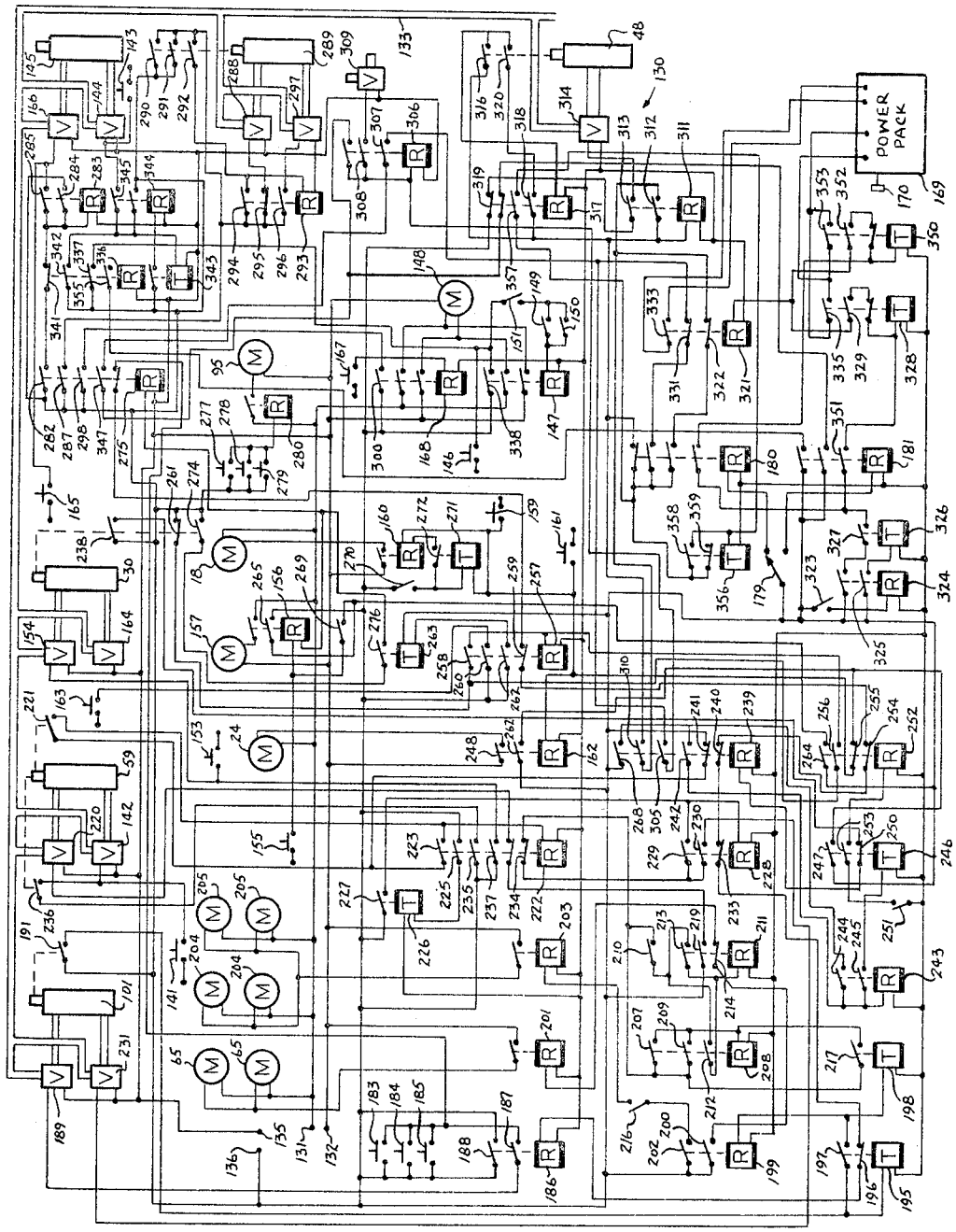
FIGURE 7 is a schematic system diagram for operation of the apparatus illustrated and described.

FIGURE 7 is a schematic diagram of a system 130 for automatically controlling operation of the apparatus. The system will now be described by first describing in sequence certain manual operations which should be performed before initiating automatic operation, and then describing the sequence of operations which take place during automatic operation.

Initially, a pair of input terminals 131 and 132 are connected to a suitable supply voltage source, to permit application of voltage to various motors of the system. In addition, fluid pressure is applied to a main supply line 133 for application through control valves to various hydraulic actuators. It may here be noted that unloading valves, not shown, are preferably provided for returning fluid from the hydraulic actuators to a reservoir, also not shown.

During the initial manual set-up operation, a control voltage source is connected to a terminal 135 and to terminals connected to various push button switches now to be described. After the manual set-up operation is completed, the control voltage source is connected between terminal 135 and another terminal 136, and automatic operation can then be initiated. The control voltage may preferably be applied through contacts of a "manual-automatic" switch or relay, not shown. It may also be noted that additional push button switches are preferably provided to permit a manual override of various automatic operations, but a number of such switches are not shown in the interests of brevity.

In the initial manual set-up operation, a "discharge arm lower" push button switch 141 is initially depressed to energize the actuator of a hydraulic valve 142 to thereby apply fluid pressure to the hydraulic actuator 59 for the discharge or transfer arms 54, to thereby place the arms 54 in a lowered position.

A head stock unclamp push button switch 143 is then depressed to energize the actuator of a hydraulic valve 144 to apply fluid pressure to a hydraulic actuator 145 incorporated in the head stock assembly 38 to retract a contact head thereof.

A tail stock unclamp push button switch 146 is next depressed to energize a relay 147 and to energize a motor 148 of the tail stock assembly 37 in a reverse direction to retract the carriage 37a and the tail stock 35. When the tail stock is retracted to a certain position, a limit switch 149 is actuated to deenergize the relay 147 and the motor 148. If, however, a long billet is on the transfer table, the limit switch 149 is shorted out by a switch 150 and the relay and motor remain energized until a second limit switch 151 is operated in a fully retracted position of the tail stock carriage 37a.

Next an "ease-down arms raise" push button switch 153 is depressed to energize the actuator of a valve 154 to apply fluid pressure to the hydraulic actuator 30 and thereby raise the arms 28.

A load table drive motor push button switch 155 is then depressed and held to energize a relay 156 and thereby energize a motor 157 of a mechanism, not shown, which serves to position a billet on the rollers 14.

A roller conveyor drive start push button switch 159 is then momentarily depressed to energize a relay 160 and to energize motors 18 to move the end of the billet into engagement with the snubber 19.

Next, a transfer conveyor push button switch 161 is depressed to energize a relay 162 and the motor 24 to convey the billet against the ease-down arms 28.

An "ease-down arms lower" push button switch 163 is then depressed to energize the actuator of a valve 164 to apply fluid pressure to the hydraulic actuator 30 and thereby lower the arms 28 to deposit the billet into the magnetizing station.

Thereafter, a head stock clamp push button switch 165 is depressed to energize the actuator of a valve 166 and apply fluid pressure to the hydraulic actuator 145 in the head stock assembly 38, to extend the contact head thereof.

A tail stock clamp push button switch 167 is then depressed to energize a relay 168 and to energize the motor 148 in a forward direction to extend the carriage 37a and the tail stock 35 into firm engagement with the billet. Current is then passed through the billet, the contacts of the head stock and tail stock assemblies being connected to a power pack 169. A control 170 on the power pack 169 may then be adjusted to obtain the proper current as indicated on a suitable meter.

Thereafter, the tail stock unclamp push button switch 145 and the head stock unclamp push button switch 143 are successively depressed to retract the respective contact heads thereof.

The manual set-up operation is then completed, but it should be noted that the billet residing in the magnetizing station should be rerun as it is used only for magnetizing current set-up and has not been properly tested.

Before initiating automatic operation, a control voltage source is connected to terminals 135 and 136 as above noted, and a process selector switch 179 is also set in either a "continuous" position to energize a relay 180 or in a "residual" position to energize a relay 181.

Any one of three "run-out drive" push button switches 183, 184 or 185 is then depressed to energize a relay 186 which is maintained energized through a holding contact 187. A contact 188 is then closed to energize the actuator of a valve 189 to apply fluid pressure to the hydraulic actuators 101 of the billet-turner assemblies to lower the assemblies until a limit switch 191 is closed to energize a timer 195 to open a contact 196 in the circuit of relay 186 and to close a contact 197 to energize a timer 198 and a relay 199. A contact 200 then closes to energize a relay 201 and to energize drive motors 65, and another contact 202 closes to energize a relay 203 and energize drive motors 204 for the transfer rollers 108 and drive motors 205 for the unloading table rollers 109.

If a billet is present in the viewing station, it is discharged to actuate and hold a sensing or flag switch contact 207 to energize a relay 208, a holding contact 209 being then closed. When the billet is totally discharged from the viewing station, another flag switch contact 210 is closed to energize a relay 211 through a contact 212 of the relay 208, a holding contact 213 being then closed. Contact 214 of relay 211 then opens to deenergize motors 65. When the billet reaches the unloading table, a sensing or flag switch 216 opens to deenergize the relay 203 and thereafter deenergize motors 204 and 205.

If a billet is not present, the timer 195 times out after a certain time delay, to deenergize relay 199 and timer 198. Timer 198 then times out to close a contact 217 and energize relay 208, thereby resulting in the deenergization of all run-out motors.

After deenergization of all run-out motors, a contact 219 of the relay 211 is closed to energize the actuator of a valve 220 and to apply fluid to the hydraulic actuators 59 for the discharge or transfer arms 54, to thereby raise the arms 54, and to transfer a billet from the magnetizing station to the viewing station. At the maximum raised position of the arms 54, a limit switch 221 is closed to energize a relay 222, a holding contact 223 thereof being closed, and another contact 224 being then opened to deenergize the actuator of valve 220. Contact 225 then closes to energize a timer 226 which closes a contact 227 to energize a relay 228, a holding contact 229 thereof being then closed.

A contact 230 of relay 228 closes to energize the actuator of a hydraulic valve 231 which applies fluid to the hydraulic actuators 101 in a direction to raise the billet turners, thereby opening limit switch contacts 191 to deenergize timer 195. At the same time, contact 233 of relay 228 opens to render the run-out drive push button switches 183–185 inoperative.

Energization of relay 222 also causes normally closed contacts 234 thereof to open to deenergize relays 208 and 211 and to thereby deenergize the actuator of valve 220, and normally open contact 235 closes to energize the actuator of valve 142 to cause the discharge arms 54 to lower, until a limit switch 236 is opened at the fully lowered position of the arms.

Normally open contact 237 of relay 222 closes to energize the actuator of valve 154 to cause the ease-down arms 28 to raise and at the upper limit, a limit switch 238 operates to energize a relay 239 to cause a contact 240 thereof to open to render push button switches 183–185 inoperative, to cause contact 241 to open to deenergize relay 222, and to cause contact 242 to close to energize a relay 243. Relay 243 closes a holding contact 245 thereof and also closes a contact 245 to energize a timer 246 to close a contact 247 thereof to close to energize the relay 162 which closes a holding contact 248 and which energizes the transfer conveyor drive motor 24.

Upon energization of timer 246 a contact 250 opens to deenergize the relay 239.

The transfer conveyor causes a billet to be deposited against the ease-down arms 28 and the billet closes limit switch contacts 251 to energize a relay 252, contact 253 of the timer 246 being then closed. Contact 254 of relay 252 opens to render the push button switches 183–185 inoperative, contact 255 opens to deenergize the relay 162 to deenergize the transfer conveyor drive motor 24, and contact 256 closes to energize a relay 257 which closes a holding contact 258 and which opens a contact 259 in the circuit of the push button switches 183–185.

Relay 257 also closes contacts 260 to energize the actuator valve 164 to cause the ease-down arms 28 to lower, a limit switch 261 being opened at the lower limit to deenergize the relay 257. At the same time a contact 262 of relay 257 is closed to energize a timer 263.

Upon energization of relay 252, contacts 264 thereof close to energize the relay 156 which then closes a holding contact 265 and energizes the load table drive motor 157.

In addition to the foregoing operations, the depositing of a billet against the ease-down arms opens a limit switch 268 to deenergize the relay 243 and the timer 246.

After energization of the load table drive motor 157, a billet is moved to open a limit switch 269 which opens to deenergize relay 156 and to close a limit switch 270 which closes to energize a timer 271 and to energize the relay 260 to energize motor 18. After a certain time delay, timer 271 times out to open contact 272 and deenergize relay 160 and motor 18.

As above noted, the ease-down arms are caused to lower by energization of relay 257 and a limit switch is operated when the ease-down arms are fully lowered, to deenergize the actuator of valve 164, the contact 262 being also open to deenergize the timer 263. At the same time, another limit switch 274 is closed to energize a relay 275, a contact 276 of the timer 263 being then closed but being opened after a certain time interval to deenergize the relay 275. The relay 275 is thus energized for a certain time interval and it operates to perform certain functions as will be explained below.

At this point in the cycle of operation, a billet at the viewing station can be inspected by depressing any one of three push button switches 277, 278 or 279 to energize a relay 280 which, in turn, energizes the billet-turning motor 95. The billet may be stopped at any desired position by release of a push button switch, and may be rotated further by again depressing the push button switch. This control is very important for proper inspection, since the operator can stop the billet for more careful inspection when he observes what may be the indication of a defect and if he finds that there is a defect, he can apply a suitable mark on the billet. It is also important that the billet can be rotated through more than one complete turn if desired, to insure more careful inspection.

As above noted, the relay 275 is energized for a certain time interval as determined by the operation of the timer 263. At this time, normal open contact 282 of the relay 275 is closed to energize a relay 283 and to close a holding contact 284 thereof. Contact 285 of relay 283 closes to energize the actuator of valve 166 to extend the contact head of the head stock assembly. Contact 286 of relay 275 is open to render the push button switches 183–185 inoperative.

Normally open contact 287 of relay 275 closes to energize the actuator of valve 288 to operate actuator 289 for the ejector 111. Limit switches 290 and 291 are then operated to short out the contact 287. At the end of the ejector stroke, a limit switch 292 is closed to energize a relay 293 to close a holding contact 294 and to open a contact 295 to deenergize the actuator of valve 288, while contact 296 is closed to energize the actuator of valve 297 to cause operation of the actuator 289 to retract the ejectors 111. At the complete retraction of the rejectors, limit switches 290 and 291 are opened to deenergize relay 293 and the actuator valve 297.

Normally open contact 298 of relay 275 closes to energize the relay 168 to energize the motor 148 of the assembly 37 in a forward direction to extend the carriage 37a and the tail stock 35, a holding contact 300 of the relay 168 being closed. When the billet is firmly clamped, a limit switch 302 is opened to deenergize relay 168 and the motor 148 and a limit switch, not shown, is closed to initiate processing of the billet.

The setting of the process selector switch 179 determines the method of pocessing the billet. In the continuous method, the relay 180 is energized and in the residual method, the relay 181 is energized.

In the continuous method, when the limit switch 238 is closed to energize relay 239, a contact 305 thereof is closed to energize a relay 306, a holding contact 307 being then closed, and a contact 308 is closed to energize the actuator of a valve 309 to apply a bath to the applicator trough.

Contact 310 of relay 239 closes to energize a relay 311 to close a holding contact 312 and to close a contact 313 to energize the actuator of a valve 314 which applies fluid to the hydraulic actuator 48 to lower the bath applicator 47. When the bath applicator 47 is fully lowered, a limit switch 316 is closed to energize a relay 317, to close a holding contact 318 thereof and to open a contact 319 to deenergize the actuator of valve 314 and to cause the bath applicator 47 to raise. When the applicator is fully raised, a limit switch 320 is opened to deenergize relay 317 whereupon contact 319 again closes to energize the actuator of valve 314 to cause the applicator to lower. Thus the bath applicator is caused to oscillate and it will continue to oscillate until a relay 321 is energized to open a contact 322 in the energization circuit of the relay 311.

When the billet is firmly clamped between the contact heads, a limit switch 323 is closed to energize a relay 324 to close a contact 325 thereof and to energize a timer 326 after which a contact 327 is closed to energize a timer 328 having a contact 329 which closes to energize the relay 321. Contact 331 of relay 321 then opens to deenergize relay 306 and to open contact 308 thereof to deenergize the actuator of valve 309. Contact 322 of relay 320 opens to deenergize relay 317 and the actuator of valve 314. Contact 332 opens to render switches 183–185 inoperative. Contact 333 closes to apply magnetizing current from the power pack 169.

Thereafter, timer 328 times out and a contact 335 thereof is closed to apply a signal to the power pack and to discontinue the magnetizing current. A signal is then applied to deenergize a relay 336, and contacts 337 thereof close to energize the relay 147 to start the tail stock motor 148 in a reverse or unclamp direction. After movement to a certain position, either the limit switch 149 or the limit switch 151 is opened to deenergize the drive motor 148, depending upon the size of the billet. During the reverse movement limit switch 232 opens to deenergize relay 324, timer 326 and relay 336. A contact 341 of relay 336 then opens to deenergize the relay 283 and the actuator of valve 166.

Contact 342 then closes to energize a timer 343 and a relay 344 having a contact 345 which energizes the actuator of valve 144 to move the head stock contact head in an unclamp direction. Thereafter, the timer 343 times out to open a contact 346 and to deenergize timer 343, relay 344 and the actuator of valve 144.

In the residual method, the switch 179 is set to energize the relay 181. When the ease-down arms are fully lowered, the limit switch 274 closes to energize the relay 275. Contact 347 of relay 275 then closes to energize relay 306 to energize the actuator of valve 309 and to apply bath to the applicator trough. Contact 282 closes to energize the relay 283, to energize the actuator of valve 166 and to extend the contact heads.

When a billet is firmly clamped between contact heads, the limit switch 323 is closed to energize the relay 324 to close the contact 325 thereof and to energize the timer 326 to close the contact 327 and to energize a timer 350 through contact 351 of the relay 181. A contact 352 of the timer 350 then energizes the relay 320. Contact 333 then closes to initiate application of magnetizing current.

Thereafter, timer 350 times out and a contact 353 thereof closes to establish a circuit in the power pack 169 which thereafter establishes a circuit to energize the relay 336.

Contact 337 of relay 336 then closes to energize the relay 147 to energize the motor 148 and drive the tail stock in an unclamp direction, until either the limit switch or the limit switch 151 is closed, depending upon the size of the billet.

Contact 341 opens to deenergize relay 283 and the actuator of valve 166. Contact 342 closes to energize the timer 343 and the relay 344, closing contact 345 to energize the actuator of valve 144 to retract the head stock. Thereafter, timer 343 times out to deenergize relay 344 and the actuator of valve 144.

In addition to the above operations, energization of the relay 336 causes contact 355 to close to energize the relay 311 and then the relay 317 and the actuator of valve 314, and then a timer 356 through a contact 357 of the relay 317, a holding contact 358 of the timer 356 being then closed. The bath applicator is then oscillated in the same manner as described above in connection with the continuous method, and continues to oscillate until timer 356 times out to open a contact 359.

As a final step in the cycle and after completion of inspection at the viewing station, one of the push button switches 183–185 may be depressed to initiate another cycle.

It will be understood that various other minor modifications and variations may be effected without departing from the spirit and scope of the novel concepts thereof.

We claim as our invention:

1. In apparatus for inspecting billets for flaws and imperfections as revealed by the orientation of magnetic particles on the surface of the billet;
    means providing a magnetizing station including
        means for receiving and cradling a billet,
        means for engaging and magnetizing the billet, and
        means for applying magnetic particles to the billet;
    means for conveying and delivering a billet sidewardly to said magnetizing station and including ease-down means for receiving and depositing the billet in said receiving and cradling means for thereafter magnetizing and application of magnetic particles to the billet, said ease-down means including arms continually supporting in substantially non-sliding engagement said billet during the transfer of said billet to said cradling means;
    means for transferring the treated billet from the magnetizing station;
    means providing an inspection station situated to receive the treated billet from said transferring means; and means for receiving the inspected billet from said inspection station.

2. In apparatus for inspecting billets for flaws and imperfections as revealed by the orientation of magnetic particles on the surface of the billet;

means providing a magnetizing station including
  means for receiving and cradling a billet,
  means for engaging and magnetizing the billet, and
  means for applying magnetic particles to the billet;
means for conveying and delivering a billet sidewardly to said magnetizing station and including
  skid structure leading to said cradling means and a plurality of ease-down arms engageable with the billet and swingable to deposit the billet from said skid structure into said cradling means, said ease-down arms continually supporting in substantially non-sliding engagement said billet during the transfer of said billet from the skid structure to said cradling means;
means for transferring the treated billet from the magnetizing station;
means providing an inspection station situated to receive the treated billet from said transferring means;
and means for receiving the inspected billet from said inspection station.

3. In apparatus for inspecting billets for flaws and imperfections as revealed by the orientation of magnetic particles on the surface of the billet;
  means providing a magnetizing station including
    means for receiving and cradling a billet,
    means for engaging and magnetizing the billet, and
    means for applying magnetic particles to the billet;
  means for conveying and delivering a billet sidewardly to said magnetizing station and including
    skid structure leading to said cradling means and a plurality of ease-down arms engageable with the billet and swingable to deposit the billet from said skid structure into said cradling means, said ease-down arms continually supporting in substantially non-sliding engagement said billet during the transfer of said billet from the skid structure to said cradling means;
  means for transferring the treated billet from the magnetizing station away from said conveying and delivering means and including
    a plurality of swingable transfer arms correlated in operation with said engaging and magnetizing means to shift the treated billet from said cradling means and
    skid structure receptive of the treated billet as moved by the transfer arms;
  means providing an inspection station situated to receive the treated billet from said transfer skid structure as moved by said transfer arms;
  and means for receiving the inspected billet from said inspection station.

4. In apparatus for inspecting billets for flaws and imperfections revealed by the orientation of magnetic particles on its surface;
  a supporting structure;
  said supporting structure having thereon a conveyor comprising a series of spaced, parallel axis, coplanar, aligned conveyor rollers and means for synchronously driving the rollers to convey a billet longitudinally along the rollers;
  and a purality of separate but synchronously operable billet supporting and turning assemblies carried by said supporting structure at spaced points along the conveyor and with certain of the rollers intervening between the assemblies, each of said assemblies including
    a vertically reciprocable frame carrying on its upper end portion sprocket wheels and having a billet supporting and turning sprocket chain trained over said sprocket wheels and defining a billet supporting catenary sling depending between said sprockets,
    means independent of said billet supporting and turning sprocket chain providing power directly to each of said sprockets for selectively driving said sprockets and chain,
    and means for raising and lowering said frame between a raised position wherein said sling is operable above said rollers to support a billet therein and turn the billet about its axis for inspection and a lowered position wherein said sling is below the upper sides of the rollers so that the billet will be supported by the rollers.

5. In apparatus for inspecting billets for flaws and imperfections revealed by the orientation of magnetic particles on its surface,
  supporting structure providing a vertical guideway,
  a frame vertical reciprocably supported by said guideway,
  and means for selectively raising and lowering said frame in said guideway relative to said supporting structure,
  said frame carrying:
    a billet supporting and turning sprocket chain,
    a pair of rotatably mounted sprockets on spaced parallel axes and horizontally aligned with said chain trained thereover and affording a catenary therebetween providing a billet supporting sling,
    and means independent of said billet supporting and turning sprocket chain providing power directly to each of said sprockets for selectively driving said sprockets and said chain for turning the billet in said sling.

6. In apparatus for inspecting billets for flaws and imperfections revealed by the orientation of magnetic particles on its surface,
  supporting structure,
  and a billet supporting and turning assembly carried by said supporting structure and including:
    a billet supporting and turning sprocket chain,
    a pair of sprockets on spaced parallel axes and horizontally aligned with said chain trained thereover and affording a catenary therebetween providing an upwardly opening billet supporting sling,
  means rotatably supporting said sprockets,
    means independent of said billet supporting and turning sprocket chain providing power directly to each of said sprockets for selectively driving said sprockets and said chain for turning a billet in said sling,
    and guide means adjacent to said sprockets and cooperative with said sling to maintain the billet substantially centered in the sling.

References Cited by the Examiner

UNITED STATES PATENTS

| | | | |
|---|---|---|---|
| 2,432,786 | 12/1947 | Newman | 324—38 |
| 2,822,930 | 2/1958 | MacGregor et al. | 198—33.4 |
| 2,837,200 | 6/1958 | Evans | 198—33.4 |
| 2,919,011 | 12/1959 | Tocher | 198—33 |
| 2,965,216 | 12/1960 | Riesco | 198—33 |
| 2,990,512 | 6/1961 | Gewartowski et al. | 324—38 |
| 3,016,487 | 1/1962 | Foley | 324—38 |

FOREIGN PATENTS 1,003,081   2/1957   Germany.

WALTER L. CARLSON, *Primary Examiner.*

RICHARD B. WILKINSON, *Examiner.*

F. A. SEEMAR, *Assistant Examiner.*